July 13, 1954  R. L. MATHER  2,683,814
ION BEAM MEASURING DEVICE
Filed Sept. 25, 1951  2 Sheets-Sheet 1

INVENTOR.
ROBERT L. MATHER
BY
Roland A. Anderson
ATTORNEY.

July 13, 1954  R. L. MATHER  2,683,814
ION BEAM MEASURING DEVICE
Filed Sept. 25, 1951  2 Sheets-Sheet 2

INVENTOR.
ROBERT L. MATHER
BY
Roland G. Anderson
ATTORNEY.

Patented July 13, 1954

2,683,814

UNITED STATES PATENT OFFICE 2,683,814

ION BEAM MEASURING DEVICE

Robert L. Mather, Berkeley, Calif., assignor to the United States of America as represented by the United States Atomic Energy Commission Application September 25, 1951, Serial No. 248,123

5 Claims. (Cl. 250—71)

This invention relates to an ion beam energy measuring device and more particularly to apparatus for determining the angle of emission of secondary radiation generated by bombardment as a function of the energy of the bombarding beam.

It has been demonstrated that electromagnetic radiation in the range of visible light is associated with the passage of a fast moving charged particle through matter. Such phenomenon has been explained by P. A. Cerenkov, whose name it bears, as an electromagnetic shock wave excited by the passage of a charged particle through a medium with a velocity greater than the velocity of electromagnetic radiation in the medium. Such shock wave has a wavefront having the geometry of a cone with the apex located at the particle and extending symmetrically about the axis lying along the path of the particle.

The foregoing phenomenon is utilized in the present invention by measuring the half angle of the cone as a function of beam energy. To accomplish such measurement it is necessary to accurately place a mirror in angular relation with the beam to reflect the Cerenkov radiation through an optical system onto a suitable graduated scale.

It is therefore an object of the present invention to provide a new and improved ion beam measuring device.

Another object of the present invention is to provide an ion beam measuring device which reflects Cerenkov radiation onto a scale as a function of beam energy.

Still another object of the present invention is to provide an accurate determination of the energy of a beam of particles from the Cerenkov radiation produced thereby.

A further object of the present invention is to provide an ion beam measuring device wherein a mirror is accurately disposed in angular relation with a beam of ions to reflect the Cerenkov radiation onto a film.

Another object of the present invention is to provide an apparatus for forming Cerenkov radiation by a beam of charged particles and determining the angular relation of such radiation with the beam as a measurement of the energy thereof.

A still further object of the invention is to provide an apparatus for accurately measuring the energy of a beam of charged particles without substantially affecting the focus or energy of such beam.

Further objects and advantages will be apparent from the following description and claims considered together with the accompanying drawing, in which:

Figure 1:
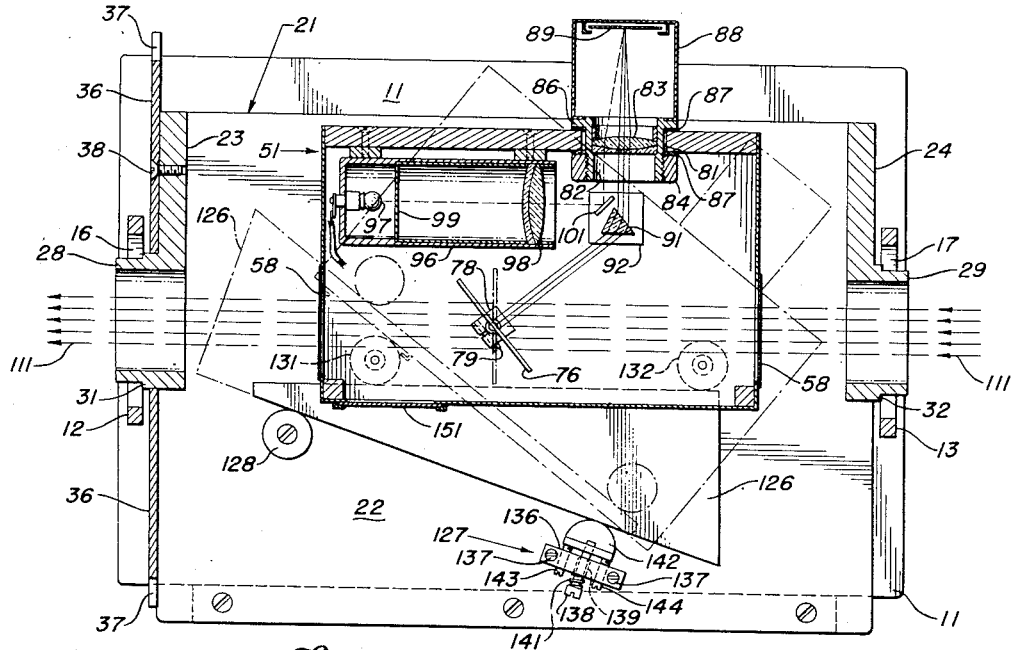
Figure 1 is a sectional plan view of the present invention with the top plate removed.
Figure 2:
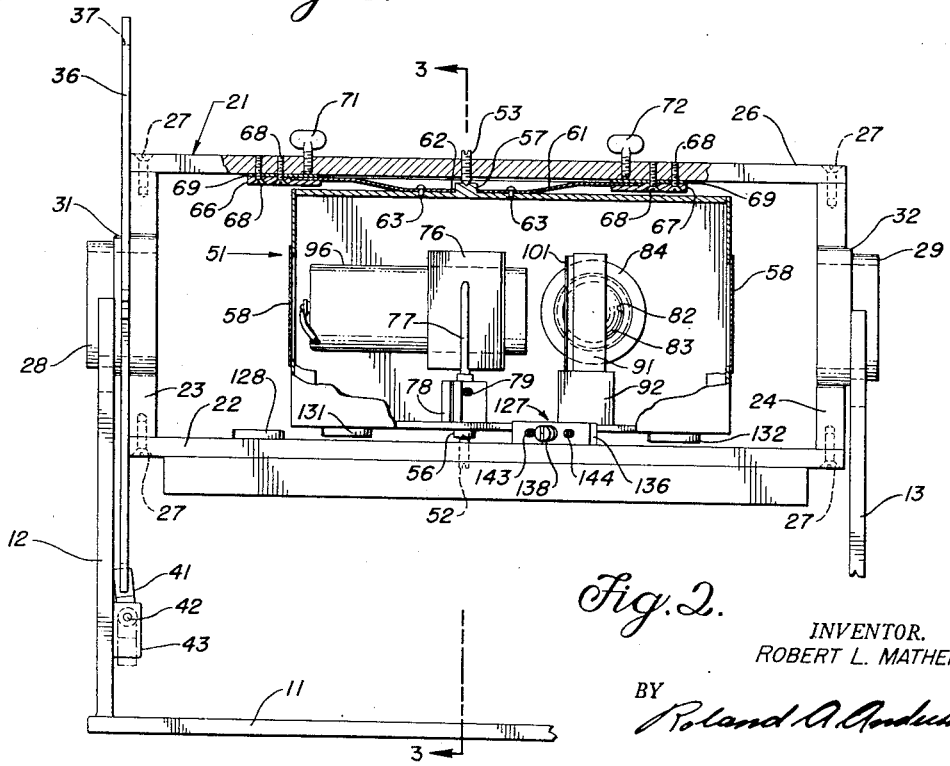
Fig. 2 is an elevational view of the invention partly in section.
Figure 3:
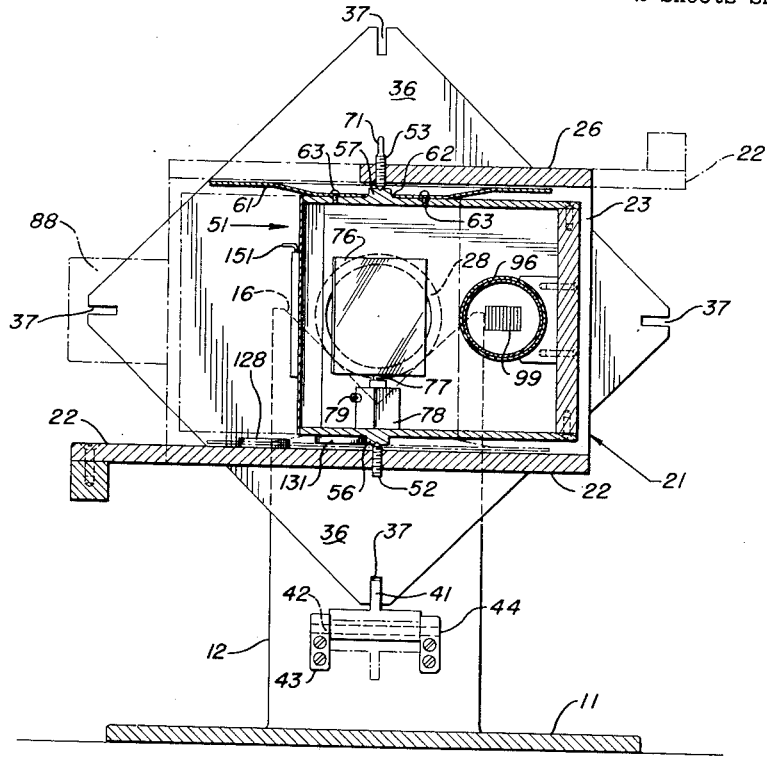
Fig. 3 is a sectional view taken along the line 3—3 in Fig. 2.

Referring to the drawing in detail, Figs. 1 and 2 in particular, there is provided a platform 11 having a pair of parallel and spaced-apart upright members 12 and 13 mounted thereon. Each of the upright members 12 and 13 are accurately aligned with respect to one another and are provided with V-cuts 16 and 17, respectively, in the uppermost portions thereof.

A framework 21 having a base plate 22, two end plates 23 and 24, and a top plate 26 is provided with such plates suitably secured together, as by screws 27, to form a rigid boxlike structure having two opposing open sides. Each of the end plates 23 and 24 have hollow tubular trunions 28 and 29, respectively, mounted in alignment therein to provide a continuous longitudinal path therebetween. The longitudinal dimension of the base plate 22 and the top plate 26 is chosen to be such that the framework 21 may be rotatably positioned between the upright members 12 and 13 with the trunnions 28 and 29 resting in the V-cuts 16 and 17. To prevent longitudinal movement of the framework 21 in such position each of the trunions 28 and 29 is provided with a collar 31 and 32, respectively, abutting against the inner surfaces of the upright members 12 and 13.

For selectively positioning the framework 21 in four positions ninety degrees apart, a square plate 36 having a slot 37 at each corner is mounted on the trunnion 28 and secured to the end plate 23, as by screws 38, so that a diagonal lies in a plane parallel to the base plate 22. To provide a catch for locking the plate 36 in the desired position, a pawl 41 is mounted on a rod 42 rotatably extended between two aligned bearing blocks 43 and 44. Thus when the pawl 41 is rotated away from the plate 36, the plate, and the framework 21, may be rotated to a new position and then locked in such position by moving the pawl to engage in the aligned slot 37.

A light-tight housing 51 is pivotally mounted within the framework 21, as by opposing and aligned pivots 52 and 53 threadably extended through tapped holes in the bottom and top plates 22 and 26, respectively, to engage bearings 56 and 57 on the walls of the housing. To provide for passage of a beam through the housing 51 a thin foil 58 permeable to such beam is mounted in an aperture, having substantially the same dimension as the hollow portions of the trunnions 28 and 29, disposed in each of the opposing end walls of the housing in alignment with the path between the trunnions. Preferably the center line of the pivots 52 and 53 is disposed transversely to the axis of the path between the trunnions 28 and 29 so that such center line and axis intersect. It is thus apparent that the angular position of the light-tight housing 51 may be adjusted with respect to the passage provided between the trunnions 28 and 29. The necessity for such adjustment will be set forth hereinafter.

A circular plate 61, having a centrally disposed aperture 62 adapted to encircle the bearing 57, is suitably secured to the housing 51 in the region of the bearing by a plurality of screws 63 or other suitable fastening means. Two catch plates 66 and 67 are mounted against the under surface of the top plate 26 of the framework 21 as by screws 68 to engage diametrically opposed circumferential portions of the circular plate 61. A strip 69 of a resilient material having substantially the same dimensions as the catch plates 66 and 67 is secured between the catch plates and the top plate 26 such that the circular plate 61 is rotatably disposed between each catch plate and strip. Provided to serve as clamps are adjustable screws 71 and 72 suitably threaded through the top plate 26 to engage the strip 69 of each clamp plate 66 and 67. Thus the light-tight housing 51 may be positioned in a desired relation with respect to the passage between the trunnions 28 and 29 and secured in such position by means of the catch plates 66 and 67 and the adjustable screws 71 and 72.

Disposed within the light-tight housing 51 is a rectangular mirror 76 mounted on a holder 77 which is pivotally held in place by a supporting block 78. The supporting block 78 is slotted and provided with a transversely extended screw 79 as a means for clamping the holder 77 in a fixed position. Preferably the mirror 76 is mounted with its center disposed along the axis of the path between the trunnions 28 and 29 and the longitudinal center line lying coincident with the axis of the aligned pivots 52 and 53. From the foregoing it is seen that the mirror may be disposed angularly with respect to the path between the trunnions 28 and 29 and fixed in such position by the screw 79. Also, after the angular position of the mirror 76 has been fixed, the light-tight housing 51 may be rotated about the axis of the pivots 52 and 53 when the screws 71 and 72 have been loosened.

One of the side walls of the housing 51 is pierced by an aperture 81 to receive a lens barrel 82 having a lens 83 mounted therein. The internally projected portion of the barrel 82 is provided with threads for engaging similar threads of a retaining ring 84. The portion of the barrel 82 which is external to the housing 51 bears a flange 86 abutting against the side wall thereof. To prevent light penetration of the housing 51 a packing ring 87 of felt or similar material is placed about the barrel 82 on either side of the housing wall. Attached to the flange 86 is a film chamber 88 for suitably disposing a strip of film 89 with respect to the lens 83. It is readily apparent that a conventional camera may be suitably adapted with the lens thereof extended through the wall of the housing 51 to accomplish the purposes of the foregoing.

Disposed between the mirror 76 and the lens 83 is an achromatic prism 91 mounted on a pedestal 92 so that light reflected from the mirror is directed to the lens 83 to be focused on the film strip 89. A projector 96 is mounted on the same side wall of the housing 51 having the aperture 81 and is provided with a bulb 97, a lens 98, and a grid work 99 disposed therebetween, the latter comprising a plurality of fine parallel mounted elements spaced apart by a predetermined distance to form a scale when projected. To direct the scale projected through the lens 98 onto the film 89 a mirror 101 is angularly mounted on the pedestal 92 between the lens 98 and the lens 83.

Since the apparatus described above is to be used for an accurate measurement of a beam 111 of charged particles such as protons, the source of such beam is known and the energy thereof determinable to lie within a relatively small range. By using the intermediate value of energy of such range it is possible to calculate, by the use of well-known formulae, the half angle of the conical Cerenkov radiation to be expected when the beam 111 passes through a medium having a known index of refraction. For best results it is then necessary to set the position of the mirror 76 at an angle equal to the determined angle of the Cerenkov radiation plus ninety degrees with respect to the center line of the beam 111, in which instance the Cerenkov radiation will be substantially normal to the plane of the mirror and at the center of the measurable range.

With the apparatus of the present invention placed along the path of the beam 111 so that the beam passes through the hollow trunnions 28 and 29, the mirror 76 is angularly disposed, substantially at the previously discussed angle with respect to the beam, with the coated surface away from the source. Preferably the coating or reflecting surface of the mirror 76 is substantially permeable to the beam and may be aluminum. An accurate determination may be made, even though the direction of the beam 111 has not been absolutely established as parallel with respect to a line extended between the centers of the trunnions 28 and 29, by taking two exposures. The second of such exposures should be made after inverting the equipment by means of the square plate 36. The two exposures may then be averaged to determine the exact exposure which would have occurred had the axis of inversion of the equipment been parallel to the beam 111.

The angle between the axis of inversion and the normal to the aluminized surface of the mirror 76 may be accurately set by the use of a precision angle template 126, as shown in Fig. 1, an adjustable bumper 127 and a fixed circular bumper 128 mounted on the upper surface of the base plate 22, and a pair of spaced-apart fixed circular bumpers 131 and 132 mounted on the under surface of the housing 51 adjacent to the base plate. The adjustable bumper 127 is provided with a block 136 mounted on the base plate 22, as by screws 137, a screw 138 extended loosely through an aperture 139 in the block which is parallel to the base plate, a spring 141 disposed between the screw head and the block, a semicircular head 142 engaged by the extended end of the spring-mounted screw, and a pair of adjustment screws 143 and 144 threadably extended through the block with one on each side of the spring-mounted screw and parallel thereto to abut against the head. Thus by manipulation of the screws 143 and 144 the position of the bumper head 142 is adjustable.

The two fixed bumpers 131 and 132 on the housing 51 are disposed to lie along a line parallel to the center line of the beam passageway through the housing. Preferably the precision angle template 126 is a right triangle having one angle equal to one-half of the above-discussed half-angle of the anticipated Cerenkov radiation. Now, with the template 126 placed on the plate 22 between the bumpers 127, 131, and 132, the fourth bumper 128 is disposed so that the template maintains the housing 51 in a normal position such that the passage between the windows 58 is aligned with that between the trunnions 28 and 29.

With the bumpers 127, 128, 131, and 132 disposed in the manner set forth above, the template 126 is wedged therebetween to rotate the housing 51 about the axis of the pivots 52 and 53. In such rotated position the normal to the aluminized surface of the mirror 76 should lie parallel to the axis of inversion of the housing 51. Such condition may be checked by viewing the image of a distant light source as reflected by the aluminized surface of the mirror 76 with a telescope equipped with a pair of cross hairs. If the proper condition exists the position of the image will not change when the instrument is inverted and any variation may be corrected by changes of the adjustable bumpers 127. Then by wedging the template 126 between the bumpers 127, 128, 131, and 132 from the other direction, the angle between the normal to the mirror 76 and the axis of inversion is exactly twice the angle of the template. For the purpose of making the foregoing determinations a removable door 151 is provided in a side wall of the housing 51 so that the aluminized surface of the mirror 76 is visible when the housing is angularly disposed.

Figure 4:
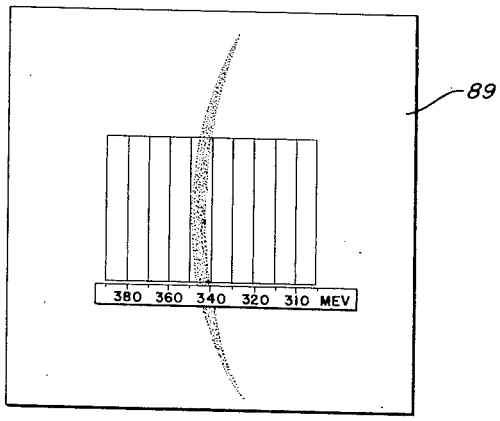
Fig. 4 is a diagram illustrating a film of the projected Cerenkov radiation and a superimposed grid.

After aligning the equipment with respect to the beam 111 in the above-discussed manner, the position of the film image may be related to the angle between the ray directions inside the glass and the normal to the aluminized surface. The foregoing may be accomplished by placing an assembly (not shown) carrying a cross hair arrangement in the plane normally occupied by the film strip 89. A source of light is then placed behind the cross hair arrangement to project an image through the lens 83, through the prism 91, and onto the mirror 76. Such image is then reflected along the same path to form a real image in the plane of the cross hair. With the prism set for minimum deviation and the cross hair set so that its reflected image coincides with itself, the projector 96 is turned on and the scale 99 adjusted so that the central line thereof coincides with the position of the cross hair and its image. Upon reassembly of the film chamber 88, accurate measurements of the energy of the beam 111 may be made from the exposed film strips 89, a sample of which is illustrated in Fig. 4.

It will be readily apparent that the present invention may be used to accurately determine the energy of beams of accelerated particles within ranges of such energy. By using various templates 126 having certain predetermined angles, the apparatus may be aligned in the manner described in the foregoing.

While the salient features of the present invention have been described with respect to one embodiment, it will, of course, be apparent that numerous modifications may be made within the spirit and scope of the invention, and it is not desired to limit the invention to the exact details shown except insofar as they may be defined in the following claims.

What is claimed is:

1. In a device for measuring the energy of a charged particle beam, the combination comprising a supporting structure having two spaced-apart and aligned bearing surfaces, a framework having two oppositely disposed hollow trunnions rotatably engaging said bearing surfaces, a square plate centrally mounted on one of said trunnions and secured to said framework, means associated with said plate for controlling the position thereof in ninety degree steps, a housing impervious to light but permeable to high energy particles, pivot means supporting said housing within said framework along the path between said trunnions, a medium disposed in said housing and in the path between said trunnions, and means disposed in said housing for registering the angle of light radiation from said medium when high energy particles travel the path between said trunnions as an indication of the energy of said particles.

2. In a device for accurately determining the energy of a beam of charged particles when the value of such energy is within a predetermined range, the combination comprising a supporting structure having two spaced-apart and aligned bearing surfaces, a framework having two oppositely disposed hollow trunnions rotatably engaging said bearing surfaces, a square plate centrally mounted on one of said trunnions and secured to said framework, means associated with said plate for controlling the position thereof in ninety degree steps, a housing impervious to light but permeable to high energy particles traveling the path between said trunnions, pivot means supporting said housing within said framework about an axis normal to and intersecting with the center line of said trunnions, a mirror disposed in said housing and having a center line thereof coincident with the axis of said pivot means, the reflecting surface of said mirror being permeable to said particles and disposed away from the direction thereof, a strip of film disposed within said housing, and an optical system disposed between said mirror and said film for directing light radiation developed within said mirror onto said film in accordance with the angle of said radiation with respect to said particles as an indication of the energy thereof.

3. In a device for accurately determining the energy of a beam of charged particles when the value of such energy is within a predetermined range, the combination comprising a supporting structure having two spaced-apart and aligned bearing surfaces, a framework having two oppositely disposed hollow trunnions rotatably engaging said bearing surfaces, a square plate centrally mounted on one of said trunnions and secured to said framework, means associated with said plate for controlling the position thereof in ninety degree steps, a housing impervious to light but permeable to high energy particles traveling the path between said trunnions, pivot means supporting said housing within said framework about an axis normal to and intersecting with the center line of said trunnions, a glass mirror disposed in said housing and having a center line thereof coincident with the axis of said pivot means, the reflecting surface of said mirror being permeable to said particles and disposed angularly away from the direction thereof, the angle of said mirror with respect to the direction of said particles being proportional to the energy corresponding to the median of said predetermined range, a strip of film disposed within said housing, and an optical system disposed between said mirror and said film for directing light radiation developed within said mirror onto said film in accordance with the angle of said radiation with respect to said particles as an accurate indication of the energy thereof.

4. The combination of claim 1 wherein said medium is further defined as a sheet of glass having a light reflecting surface which is transparent to charged particles.

5. The combination of claim 4 further characterized by an adjustable support mounted within said housing to angularly dispose said sheet of glass in the path between said trunnions with the light reflecting surface positioned away from the direction of travel of charged particles directed through said housing.

References Cited in the file of this patent

UNITED STATES PATENTS

| Number    | Name    | Date          |
|-----------|---------|---------------|
| 2,401,327 | Bednash | June 4, 1946  |
| 2,405,063 | Sisson  | July 30, 1946 |

OTHER REFERENCES

Cerenkov Radiation, Collins et al., Physical Rev., Oct. 1, 1938, vol. 54, pp. 499–503.